UNITED STATES PATENT OFFICE.

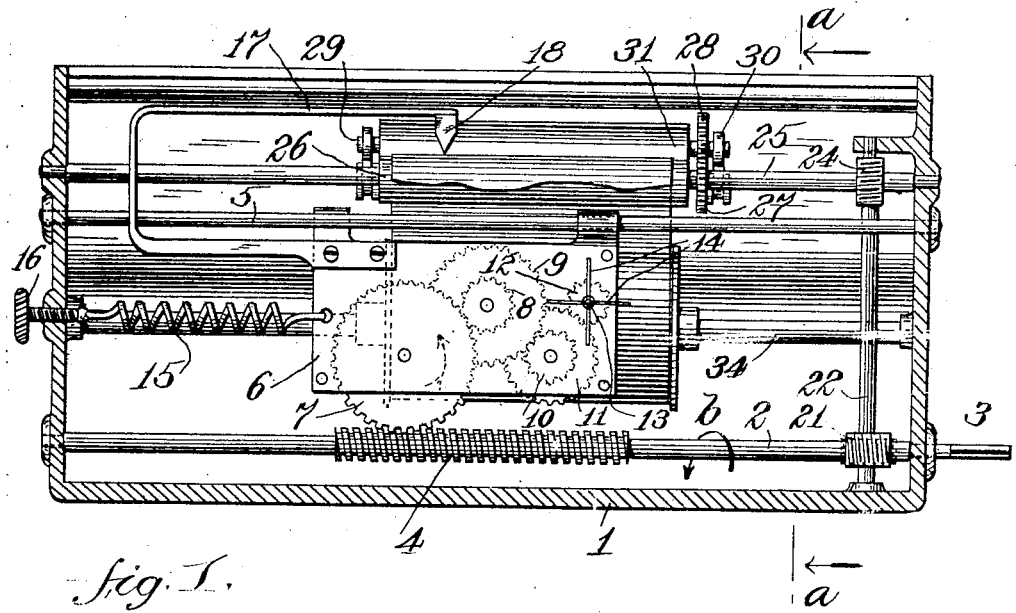

FRITZ F. UEHLING, OF PASSAIC, NEW JERSEY.

SPEED INDICATOR AND RECORDER.

No. 904,660.  Specification of Letters Patent.  Patented Nov. 24, 1908.

Application filed December 13, 1906. Serial No. 347,651.

*To all whom it may concern:*

Be it known that I, FRITZ FREDERICK UEHLING, a citizen of the United States of America, and resident of the city of Passaic, county of Passaic, and State of New Jersey, have invented certain new and useful Improvements in Speed Indicators and Recorders, of which the following is a specification.

My invention relates to speed indicators and recorders and it is especially adapted to be used in connection with wheeled vehicles.

The object of my invention is to produce a speed indicator and recorder of this class which shall indicate at any instant the actual speed of a shaft and which when appropriately connected with a wheeled vehicle shall indicate the speed at which the vehicle travels, the distance traveled, and record continuously the speed and distance.

My invention consists in the novel construction and arrangement herein described and particularly pointed out in the claims.

In the drawings accompanying and forming a part of this specification, Figure 1 is a front view partially in section, Fig. 2 is a section on line *a—a* of Fig. 1, and Fig. 3 is a detail view showing the connection between the chart mechanism and the main shaft.

The reference characters are used in the same sense in the drawings and specification.

Numeral 1 represents a case in which is mounted the main shaft 2 which extends outside of the case, having a squared end 3 adapted to be connected in any convenient manner with the shaft or wheel whose speed is to be indicated and recorded. Formed upon the shaft 2 is a long worm 4, the purpose and function of which will be hereinafter described.

Mounted upon guide rods 5—5 which are parallel with the shaft 2 is a sliding frame 6. This frame carries the worm wheel 7 which meshes with the worm 4 and a train of gears 8, 9, 10, 11, and 12. The shaft 13 on which the gear 12 is mounted, carries a fan or vane 14. A spring 15 is connected with the sliding frame 6 and an adjusting screw 16 and tends to pull the sliding frame in a direction opposite to that which would be given to it by the worm 4 when there is resistance to the turning of the worm wheel 7. The shaft 2 turns in the direction of the arrow *b*. When the frame 6 is stationary and the shaft 2 is revolved the fan 14 will have a certain definite velocity ratio relative to the shaft 2. The revolution of the fan 14, however, produces a certain resistance between the teeth of the worm wheel 7 and the worm 4 and this resistance will vary with the speed of revolution and will cause the sliding frame to move, to the right as seen in Fig. 1, until it is balanced by the resistance of the spring 15. Whenever the frame is at rest there will be a certain velocity ratio between the fan 14 and the shaft 2 and this will equal the normal velocity ratio, and whenever the sliding frame moves in either direction this velocity ratio will be changed, or vice versa, whenever the velocity ratio differs from the normal the sliding frame will move to the right or to the left. This arrangement is in effect a form of differential gearing in which the movement of the driving shaft 2 may result in either the movement of the frame 6 or the revolution of the fan 14 or both combined according to the strength of the spring 15 and the resistance offered to the motion of the fan and it will be normal when the resistance of the spring just counterbalances that of the fan.

Attached to the sliding frame 6 is an indicating arm 17 which carries a marking point 18.

The shaft 2 is provided at its end with a worm 20, engaging the worm wheel 21 on the shaft 22. At the other end of the shaft 22 is a worm 23 engaging the worm wheel 24 on the shaft 25. A roller 26 is mounted on the shaft 25 and a gear 27 engaging the gear 28 on the shaft 29. The shaft 29 is mounted in an adjustable frame 30 and it also carries the roller 31 which is adapted to press upon the roller 26 by means of the adjusting screw 32. A roll of paper forming the chart 33 is mounted upon the shaft 34 at the rear and the shaft 35 at the front. The roll 35 is adapted to be driven in any suitable manner which will take up the slack chart as it is fed through by rolls 31 and 26. By means of these connections it will be seen that the chart is fed underneath the marking point 18 at a rate proportional to the speed of rotation of the shaft 2 and that the position of the marking point 18 will be controlled by the speed of the shaft 2 through the mechanism hereinbefore explained.

Having thus described my invention what I claim is:

1. In a speed recording device the combination with a rotatable shaft of a movable frame and a rotatable member mounted in said frame and connections between said rotatable member and said shaft adapted to move said frame when said rotatable member is held against movement and to move said rotatable member when said frame is held against movement and means for causing a resistance to said rotatable member adapted to vary with the speed of said shaft.

2. In a speed recording device the combination with a case of a frame slidably mounted in said case, a rotatable fan mounted in said frame, a rotatable shaft mounted in said case and connections between said fan and said shaft such that the movement of said frame relative to said shaft will cause a variation in the velocity ratio of said shaft and said fan.

3. In a speed recording device the combination with a case of a frame slidably mounted in said case, a rotatable fan mounted in said frame, a rotatable shaft mounted in said case and connections between said fan and said shaft such that the movement of said frame relative to said shaft will cause a variation in the velocity ratio of said shaft and said fan and means for opposing the movement of said frame with a resistance varying with its position.

4. In a speed recorder the combination with a case of a shaft mounted in said case having a worm formed thereon, a movable frame mounted in said case, a rotatable fan mounted in said frame in geared connection with said worm and a spring connecting said case and said movable frame.

5. In a speed recorder the combination with a case of a shaft mounted in said case having a worm formed thereon, a movable frame mounted in said case, a rotatable fan mounted in said frame in geared connection with said worm and a spring connecting said case and said movable frame and an indicator carried by said frame.

6. In a speed recorder the combination with a case of a shaft mounted in said case having a worm formed thereon, a movable frame mounted in said case, a rotatable fan mounted in said frame in geared connection with said worm and a spring connecting said case and said movable frame, a marking point carried by said frame and a chart mechanism operatively connected with said shaft.

In testimony whereof, I have signed my name to this specification in the presence of two subscribing witnesses.

F. F. UEHLING.

Witnesses:
C. A. COULTEN,
ERNEST MILLER.